United States Patent [19]
Scura

[11] Patent Number: 6,164,153
[45] Date of Patent: Dec. 26, 2000

[54] DEVICE FOR REDUCING CABLE FLOP

[76] Inventor: Brian Scura, 23011 Alcalde Dr., Building A, Laguna Hills, Calif. 92653

[21] Appl. No.: 09/132,457

[22] Filed: Aug. 11, 1998

Related U.S. Application Data

[62] Division of application No. 08/706,740, Sep. 9, 1996, Pat. No. 5,829,314.

[51] Int. Cl.[7] .................................. F16C 1/10; B62L 1/00
[52] U.S. Cl. ........................ 74/502.4; 74/502.2; 74/489; 74/501.5 R; 74/502.6; 188/24.11; 188/24.21
[58] Field of Search ................... 74/500.5–502.6, 74/501.5 R, 471, 489; 188/24.11, 24.15–24.19; 192/2 D, 35

[56] References Cited

U.S. PATENT DOCUMENTS

| | | | |
|---|---|---|---|
| 735,113 | 8/1903 | Kelland et al. | 74/502.2 |
| 1,674,751 | 6/1928 | Von Luettwitz | 188/2 D |
| 3,788,438 | 1/1974 | Reno | 192/110 R |
| 4,057,127 | 11/1977 | Woodring | 188/24 |
| 4,236,422 | 12/1980 | Cochran et al. | 74/470 |
| 5,626,209 | 5/1997 | Viola | 188/24.14 |

*Primary Examiner*—Vinh T. Luong
*Attorney, Agent, or Firm*—Irell & Manella LLP; Andrei Iancu

[57] ABSTRACT

A device for eliminating cable flop, for use with bicycle brake cable detanglers used on "trick" bicycles, includes an anchor platform pivotally mounted to a base, and brake cables connected to the anchor platform. As the bicycle handlebars spin, the anchor platform moves differentially to reciprocally compensate for differences in the length of the brake cables, thereby eliminating flop.

3 Claims, 6 Drawing Sheets

DEVICE FOR REDUCING CABLE FLOP

This is a division of application Ser. No. 08/706,740, filed on Sep. 9, 1996 now U.S. Pat. No. 5,829,314 issued on Nov. 3, 1998.

BACKGROUND OF THE INVENTION

1. Field of the Invention

The field of the invention is cabling systems.

2. Background Information

Recent attention has been directed to improving bicycles and devices and systems used on bicycles for purposes of "trick" riding. Trick riding involves performing stunts, unusual, difficult, and sometimes dangerous maneuvers on bicycles. A trick commonly performed involves spinning the bicycle handlebars while keeping the front wheel of the bicycle off the ground. Many trick bicycles, however, employ a hand brake system for the rear wheels. The hand brake is located on the handlebars and is cabled to a brake shoe system on the rear wheel.

Obviously, a cable connected directly from the handlebars to the rear wheel brake system would become tangled after a relatively small number of turns of the handlebars. To alleviate this tangling, cable detangler systems were developed. One such cable detangler system is manufactured by Scura Speed & Technology, 23011 Alcalde Drive, Building A. Laguna Hills, Calif. 92653 detangler systems sometimes include a bearing mechanism which decouples the cable attached to the hand brake from the cable, or cables, attached to the brake shoes. In this system, the single cable from the brake lever on the handle bars is split to two upper cables which are attached to either side of the upper unit in the bearing assembly. Two lower cables are in turn attached to the bottom unit of the bearing assembly, and those two cables are then reduced to a single cable which runs to the rear brake shoe assembly. As the handlebar brake lever is activated, the upper cables pull the upper unit upward, thus pulling on the lower unit, which in turn pulls on the two lower cables, causing the brake shoe assembly to actuate. Through the use of such a cable detangler, the handle bars may be rotated indefinitely without any cable tangling.

Some cable detanglers, however, suffer from various drawbacks. To assure proper fit of the bearing mechanism, the cables included in the cable detangler should desirably be manufactured to precise tolerances and the cable detangler should be installed with a high degree of precision. Due to limitations in the ability to manufacture cables to extremely precise tolerances, design flaws, and less than perfect installation techniques employed by relatively unsophisticated users, undesirable results in the use of cable detanglers sometimes result. Due partially to differences in cable lengths leading either to the bearing mechanism or the cable detangler, the bearing mechanism sometimes wobbles, or "flops", particularly when the handlebars are spun during a trick ride. This flopping impairs the spinning of the handlebars. This "flop" is a well-recognized problem in the industry.

Means of attempting to remedy these cable detangler problems include a modified cable splitter in which one cable is connected to a "floating" bar by one or more set screws within the splitter frame, such that the bar would be capable of a small amount of travel parallel to the cables. Extending away from the bar in a direction opposite the cable are two other cables also connected to the bar by set screws. This modified splitter provided some improvement, but the "floating" bar was not designed to pivot to compensate for differences in the lengths of cable detangler cables, and still did not provide for movement of the lower cables relative to one another. Thus, the "flop" was not fully eliminated. Moreover, these cables connected by set screws sometimes become frayed and worn by contact with the set screws. The cables may become loose and require precise readjustment, or replacement. These cable splitters also often require the use of special tools, including small allen wrenches, that some users and mechanics do not have.

Therefore, a need was perceived for a cable splitter that would substantially eliminate the "flop", would not become quickly worn or frayed and would not require periodic readjustment.

SUMMARY OF THE INVENTION

The present invention is directed to an apparatus which tends to reduce and substantially eliminate the flopping action of bicycle cable detanglers. A device having features of the present invention comprises an anchor platform pivotally mounted on a base attached to a bicycle with a cable detangler system. Cables leading to the cable detangler system are connected to the anchor platform. The pivotal mounting of the anchor platform permits the cables leading to the cable detangler system to move differentially with respect to each other to reciprocally compensate for "flop" in a cable detangler.

Accordingly, it is an object of the present invention to provide a device that substantially reduces the flopping action of bicycle cable detanglers. Other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings schematically illustrate preferred embodiments of the present invention in which.

DETAILED DESCRIPTION OF THE PREFERRED EMBODIMENT

Figure 1:
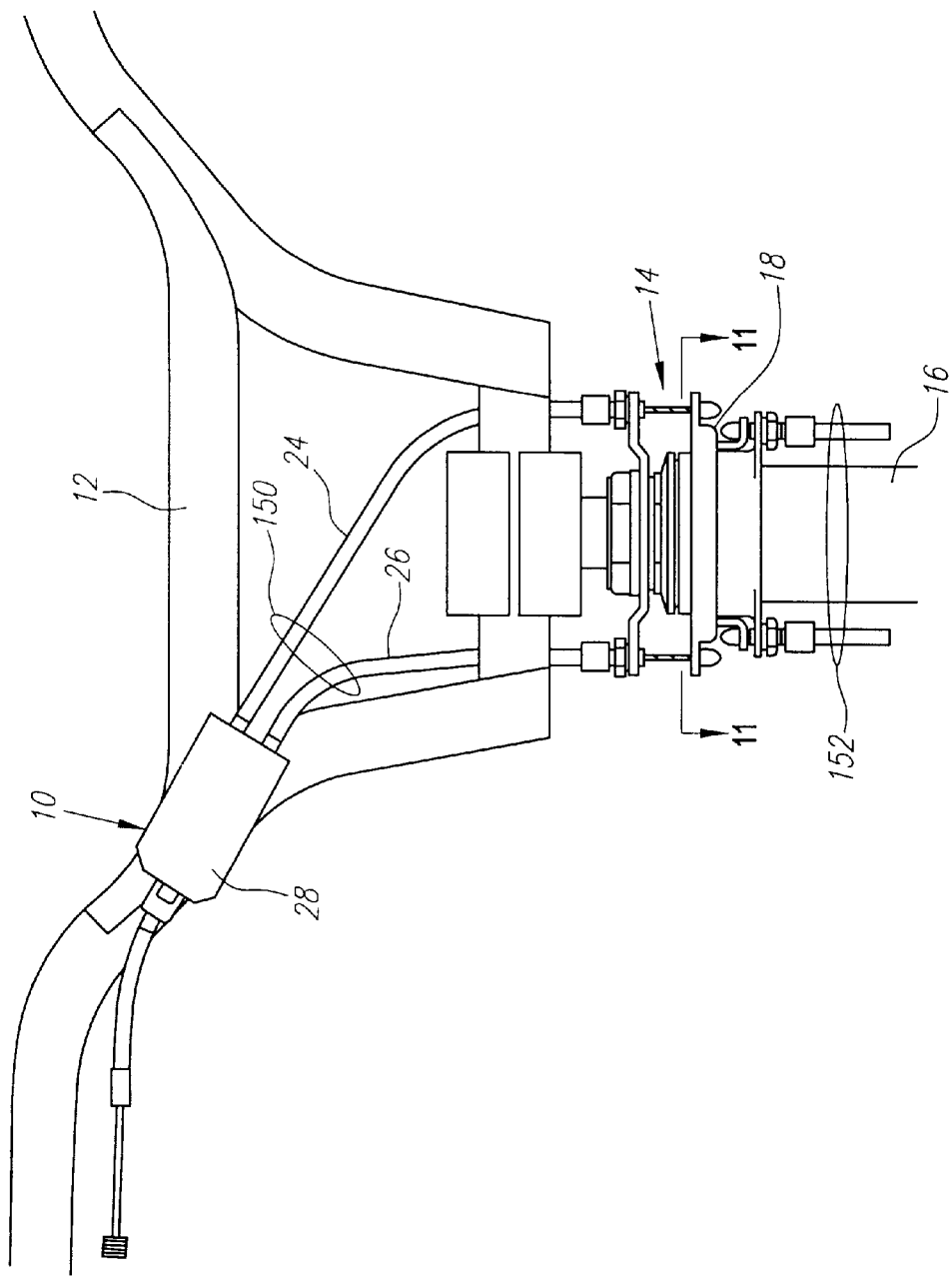
FIG. 1 is a partial cutaway view of a bicycle employing a cable splitter and a cable detangling system with which the present invention would primarily be used.

Turning in detail to the drawings, FIG. 1 illustrates a preferred embodiment of a device for reducing cable flop, in the form of a cable splitter 10 mounted on a bicycle 12 equipped with a bicycle cable detangler system 14. Bicycle cable detangler systems 14 are well known in the art and are used by bicycle "trick" riders. Such cable detangler systems allow the handlebars of a bicycle to spin without causing tangling of brake cables. Bicycle cable detangler systems 14, such as the one depicted, typically employ a bearing mechanism 18 mounted on a steering assembly 16 or other location on a bicycle 12. Such cable detangler systems will not be described further herein, except as relevant to aid understanding of the preferred embodiments of the cable splitter 10.

Figure 2:
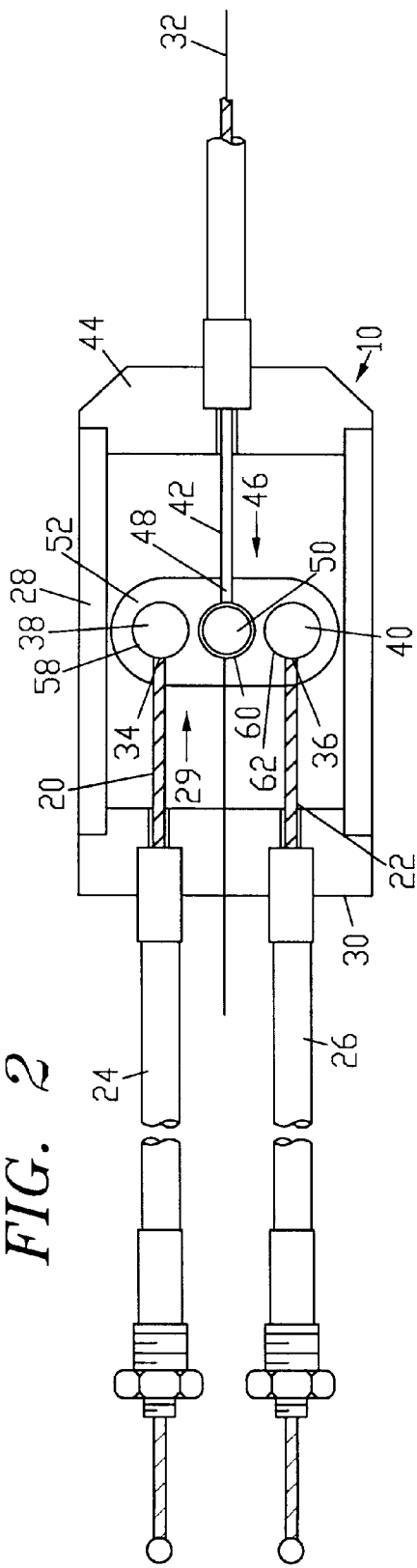
FIG. 2 is a partial cutaway plan view of a preferred embodiment of a cable splitter employing the present invention.

Turning now to the details of a preferred embodiment of cable splitter 10, as seen in FIG. 2, a pair of bicycle brake cables 20 and 22, partially covered by cable sheathings, 24 and 26, respectively, extend into a casing 28, through a first end 30 of the casing 28, and in a first direction 29 approximately parallel to a longitudinal axis 32 of the casing 28. The casing 28 is typically made of plastic, metal, or another durable substance. Bicycle brake cables 20 and 22 are well known in the art. Each cable 20 and 22 has an end 34 and 36, respectively, to which is connected an anchor, 38, 40, respectively. The anchors, 38, 40 are typically made of metal, plastic, or another durable substance and may be connected to the ends 34 and 36, respectively, by any of a number of means well known in the art, such as die-molding, die-casting, or welding.

A third cable 42 also extends into the casing 28, through a second casing end 44, and in a second direction 46, substantially parallel to the longitudinal axis 32. Similarly to the first and second cables 20, 22, the third cable 42 has an end 48, attached to which is an anchor 50.

Figure 3:
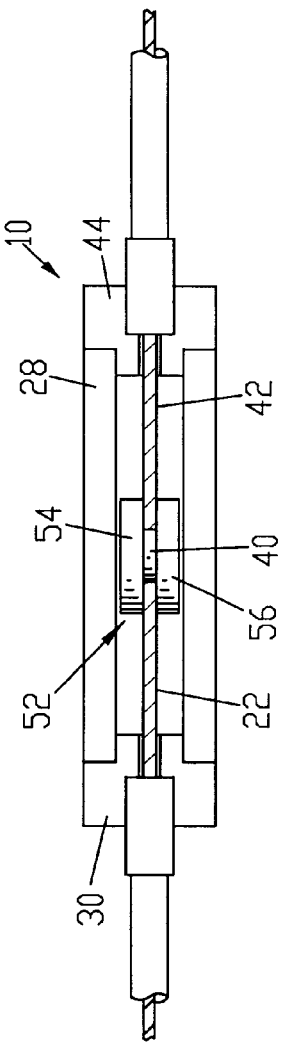
FIG. 3 is a partial cutaway elevation view of the preferred embodiment of FIG. 2.
Figure 4:
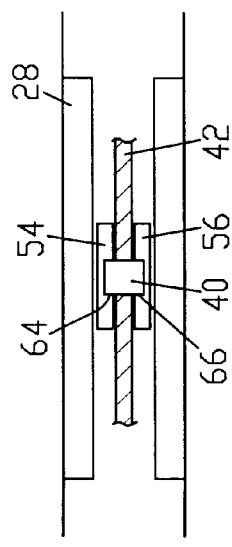
FIG. 4 is a partial cutaway elevation view of another preferred embodiment of a cable splitter employing the present invention.

The anchors 38, 40 and 50 are securely engaged in an anchoring platform, such as an anchor housing 52. Anchor 50 is engaged in the anchor housing 52 at a location approximately equidistant from anchors 38 and 40, such that the anchor housing 52 is stable when the cables 20, 22, and 42 are displaced. In the preferred embodiment, anchor 50 is located approximately at the midpoint of a line defined by anchors 38 and 40. In the preferred embodiment shown in FIGS. 2 and 3, the anchor housing 52 comprises two plates 54 and 56 and is typically made of plastic, metal, or another durable substance. The anchor housing 52 shown defines recesses 58, 60 and 62, into which the anchors 38, 50 and 40 extend. While the recesses 58, 60 and 62 of FIGS. 2 and 3 form cutouts extending all the way through the plates 54 and 56, as shown in FIG. 4, recesses 64 and 66 may also be employed which do not extend all the way through plates 54 and 56. Anchor housing 56 can also comprise only one plate, or plurality of plates.

Figures 5, 6, 7, 8, 9:
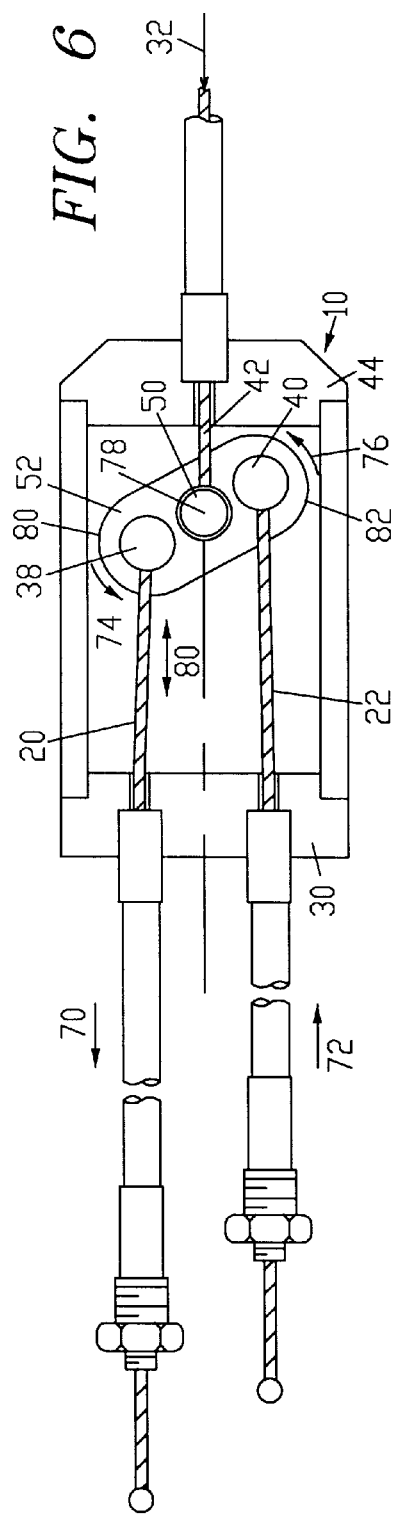
FIG. 5 is a perspective view of an anchor of the preferred embodiment of FIG. 2.
FIG. 6 is a partial cutaway plan view of the preferred embodiment of FIG. 2 illustrating an anchor housing in a rotated position.
FIG. 7 is a partial cutaway elevation view of another preferred embodiment of a cable splitter employing the present invention.
FIG. 8 is a partial cutaway plan view of the preferred embodiment of FIG. 7.
FIG. 9 is a partial cutaway elevation view of another preferred embodiment of an anchor and anchor housing of a cable splitter employing the present invention.

As shown in detail in FIG. 5, in a preferred embodiment, a rotatable anchor 38 may have a cylindrical shape, as embodied by anchor 68. This cylindrical shaped anchor 68 allows for rotation of the anchor during use of the cable splitter 10.

During use, typically as the bicycle 12 handlebars are spinning, the bearing mechanism 18 of the cable detangler system 14 may tend to wobble, or "flop", inducing a swashing action in the bearing mechanism 18. In response to this tendency, as depicted in FIG. 6, the cables 20 and 22 tend to reciprocally compensate for the swashing, with a piston-like, differential motion action, as shown by arrows 70 and 72 respectively. As the cables 20, 22 tend to reciprocally compensate, the anchor housing 52 tends to rotate in the direction of the respective arrows 74 and 76 about a pivot point 78 established by anchor 50, facilitating the piston-like, differential motion action. Similarly, as the handlebars continue spinning, the differential motion of the cables 20 and 22 reciprocates in a direction opposing respective arrows 74 and 76. Thus, the anchor housing 52 and anchors 38 and 40 rotate relative to each other. To further facilitate the rotation of the anchor housing 52, the anchor housing 52 may have curved, or partially curved extremities 80 and 82.

During use, the anchor housing 52 may also tend to move along the casing's 28 longitudinal axis 32, in the direction of arrow 80. The anchor housing is maintained within the casing 28 by casing ends 30 and 44. It should also be noted that, during use, as housing 52 rotates, cables 20 and 22 tend to bend inward towards the longitudinal axis 32. However, cables 20 and 22 still extend in from the anchor housing 52 in a direction substantially opposite the direction from which cable 42 extends.

While a preferred embodiment employs cylindrical anchors 68, such as shown in FIG. 5, other preferred embodiments may employ anchors of other shapes as well. For example, as shown in FIGS. 7 and 8, generally spherical anchors 84, 86 and 88 may be employed. Additionally, as shown in FIG. 9, other generally spherical shaped anchors 90 may also be employed which are oblate spheroid, egg-shaped, or which vary in other respects from a highly spherical shape. Indeed, anchors 90 may be of any shape, curved to any degree in two or three directions.

Figure 10:
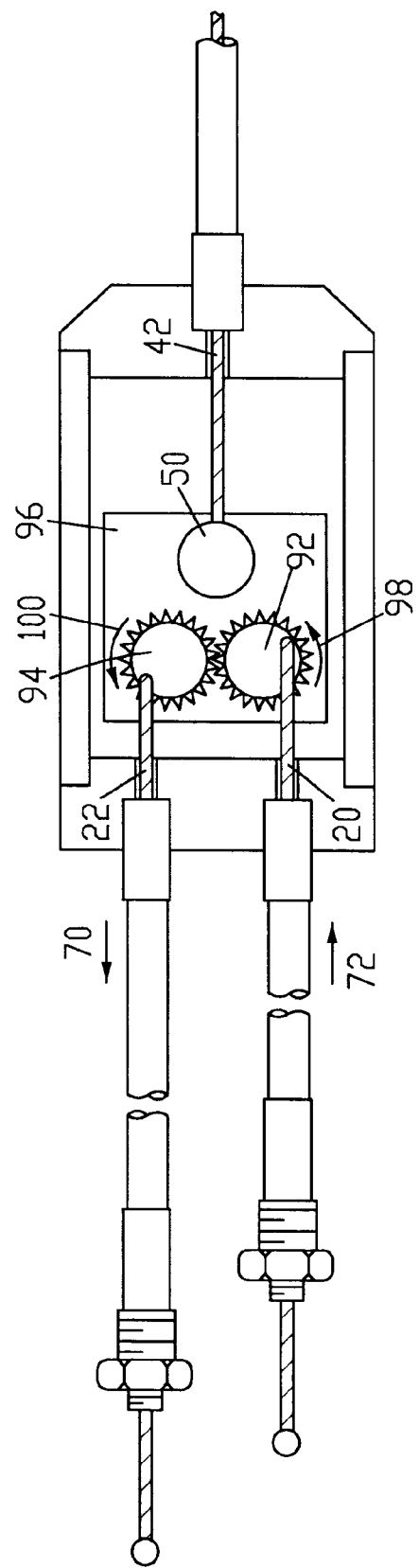
FIG. 10 is a partial cutaway plan view of another preferred embodiment of a cable splitter employing the present invention.

Another preferred embodiment, shown in FIG. 10 employs different types of anchors 92 and 94 and anchor housing 96. Geared anchors 92 and 94 are positioned within anchor housing 96 so that the respective gears are enmeshed. Cables 20 or 22 are preferably rotatably mounted to anchors 92 and 94 by pins, rivets, or other means well known in the art to reduce bending of the cables 20 and 22, and, as the cables 20, 22 tend to reciprocally compensate for flopping action, anchors 92 and 94, respectively, tend to rotate in anchor housing 96. As either anchor 92 or 94 rotates, the other enmeshed anchor, 94 or 92, respectively, tends to rotate in the other direction, as shown by arrows 98, 100, and vice-versa, facilitating the piston-like action, as shown by arrows 70 and 72.

While a preferred embodiment of the invention is shown in FIG. 1 as being placed in the upper cables of the detangler system, it will be recognized that it could be incorporated elsewhere within the system with equal effect. For example, it could be incorporated into the handlebar brake lever assembly, or into the bearing mechanism.

Figure 11:
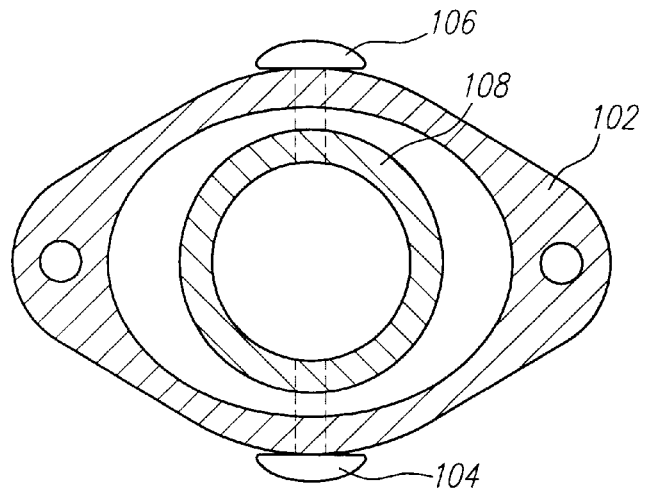
FIG. 11 is a sectional view through the cable detangling system of FIG. 1 employing another preferred embodiment of a device for reducing cable flop.
Figure 12:
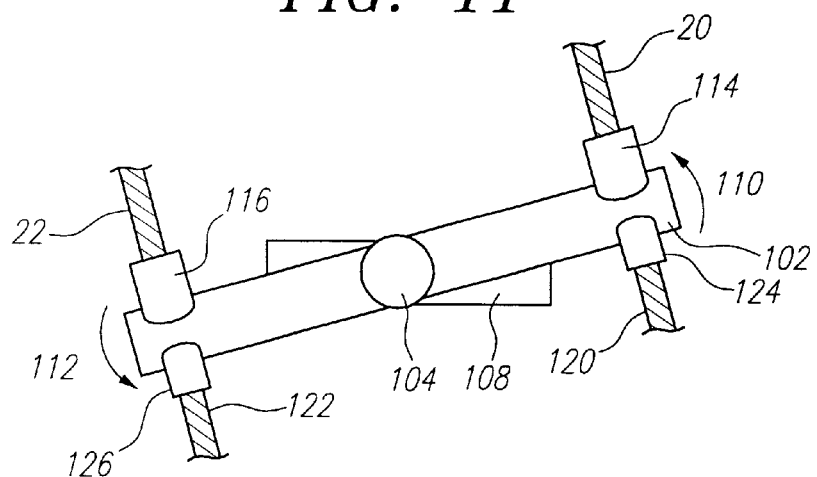
FIG. 12 is an elevation view of a preferred embodiment of the device of FIG. 11.
Figure 13:
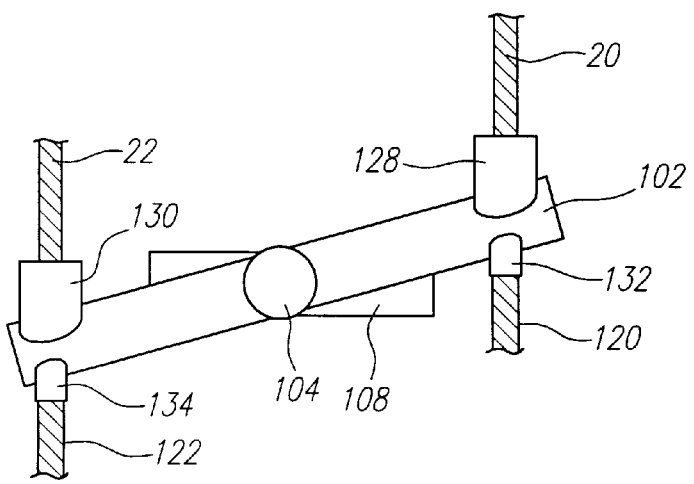
FIG. 13 is an elevation view of another preferred embodiment of the device of FIG. 11.

FIGS. 11–13 illustrate other preferred embodiments. An anchor platform 102 is pivotally mounted by pins 104 and 106, (or rivets, or any of a number of other means well known in the art,) to a base 108. Base 108 can be a washer or a plate or any other suitable component capable of providing support for the anchor platform 102. Base 108 may be incorporated within the cable detangler's 14 bearing mechanism 18 of FIG. 1. In another embodiment, base 108 may be incorporated within the upper plate 15 of cable detangler 14 of FIG. 1. Base 108 may also be incorporated within the lower plate 17 of cable detangler 14 of FIG. 1. Cables 20 and 22 are connected to the pivotable anchor platform 102. Cable 20 and 22, for example, can pass through the pivotable anchor platform 102 while cable sheathings 24 and 26, respectively, rest on pivotable anchor platform 102. As the handlebars of the bicycle 12 incorporating this preferred embodiment are spun, the pivotable anchor platform 102 tends to move differentially, as shown by arrows 110 and 112 to reciprocally compensate for differences in the lengths of cables 20 and 22 and thereby reduce or eliminate cable flop. Again, it will be appreciated by those skilled in the art that, as the bicycle's 12 handlebars continue spinning, the pivotable anchor platform 102 tends to move differentially, opposite the direction of arrows 110 and 112, to compensate for differences in the length of cables 20 and 22. To reach the location to which cables 20 and 22 would extend if the pivotable anchor platform 102 were not present, extender cables 120 and 122 also extend from the pivotable anchor platform 102.

In other embodiment, cable sheathings 24, 26 and 124, 126 may be fixedly attached to pivotable anchor platform 102 by fixed anchors 114, 116, and 124, 126 respectively. See FIG. 12. Alternatively as illustrated in FIG. 13, cable sheathings 24, 26 and 124, 126 may be rotatably attached to the pivotable anchor platform 102 by rotatable anchors 128, 130, and 132, 134 respectively. The use of rotatable anchors 128, 130, 132 and 134, in the preferred embodiment of FIG. 13 tends to reduce undesirable bending of cables 20, 22, 120 and 122.

Figure 15:
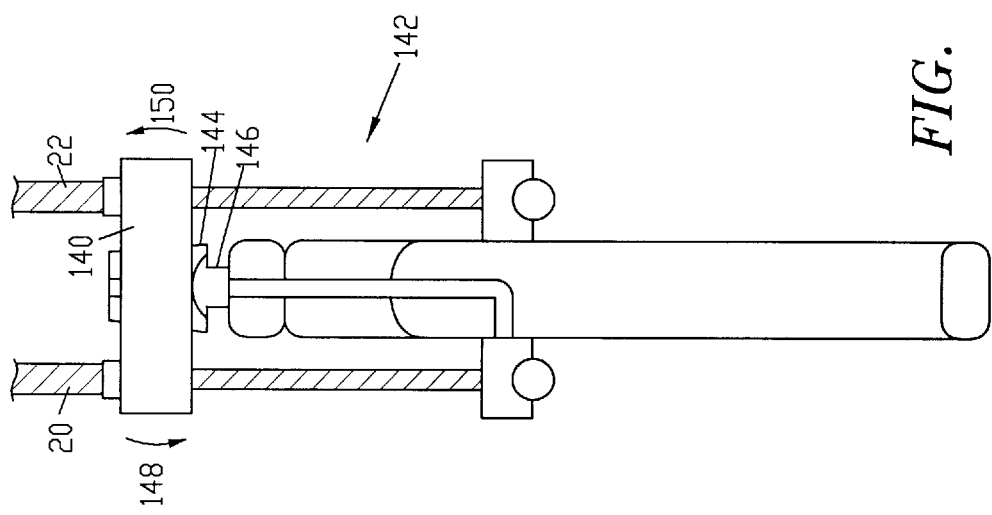
FIG. 15 is an elevation view of the brake lever assembly and preferred embodiment of FIG. 14.
Figure 14:
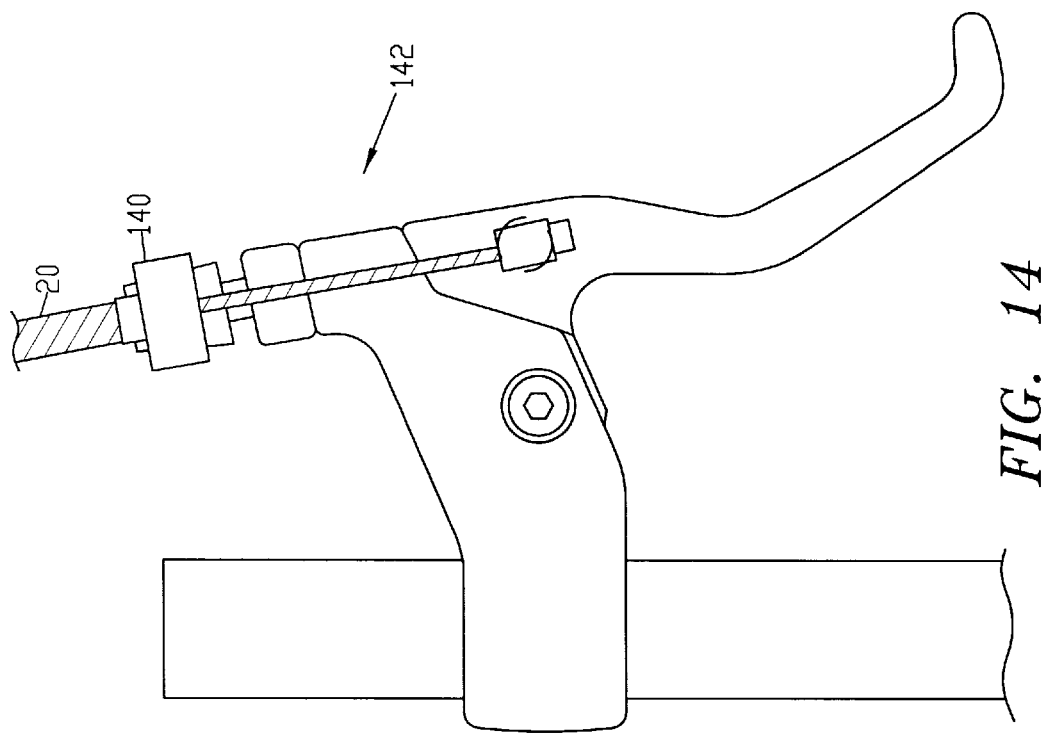
FIG. 14 is a top plan view of a brake lever assembly attached to a bicycle handle bar, and which incorporates another preferred embodiment of the present invention.

Another preferred embodiment shown in FIGS. 14–15 employs a pivotable anchor platform 140 in the brake lever assembly 142. The cables 20 and 22 extending to the detangler system 14 connect to the pivotable anchor platform 140. The pivotable anchor platform 140 contains a socket 144 which mates with and is pivotable about a base 146 mounted in the brake lever assembly 142. Base 146 can be a hemisphere or cylinder. As the bicycle 12 handlebars spin and differences in the length of cables 20 and 22 extending to the detangler 14 cause flop, the pivotable anchor platform 140 tends to move differentially in the direction of arrows 148 and 150, and vice-versa, to reciprocally compensate and reduce or eliminate cable flop.

Yet another embodiment, shown in FIG. 16, employs a pivotable anchor platform 154 in the upper or lower cable assemblies, 150 or 152 of FIG. 1. Anchor platform 154 is pivotably mounted by pin 156 to base 158. This mechanism is enclosed in casing 28. Cables 20 and 22, and cable sheathings 24 and 26 can be connected to the anchor platform 154 as in the previous embodiments.

In a further embodiment, anchor platform 162 is pivotably mounted by pin 164 to a suitable location on the bicycle frame, such as the seat mast 166, before cables 168 and 170, within respective cable sheathings 172, 174, reach the brake assembly 176.

Thus, a device for reducing cable flop has been disclosed. While variations of the illustrated preferred embodiment have been shown and described, it would be apparent to those skilled in the art that many more modifications are possible without departing from the inventive concepts herein. The invention, therefore, is not to be restricted except in the spirit of the appended claims.

I claim:

1. A device for eliminating cable flop, comprising:

a cable detangler mechanism attached to a bicycle, the bicycle having at least a frame, a brake lever, and a brake assembly, and the detangler mechanism comprising at least an upper cable assembly, a lower cable assembly, an upper plate, a lower plate, and a bearing unit;

a base attached to said upper cable assembly of said cable detangler mechanism;

an anchor platform pivotally connected to said base to pivot relative to said base to reduce cable flop; and at least two cables connected to said anchor platform.

2. A device for eliminating cable flop, comprising:

a cable detangler mechanism attached to a bicycle, the bicycle having at least a frame, a brake lever, and a brake assembly, and the detangler mechanism comprising at least an upper cable assembly, a lower cable assembly, an upper plate, a lower plate, and a bearing unit;

a base attached to said lower cable assembly of said cable detangler mechanism;

an anchor platform pivotally connected to said base to pivot relative to said base to reduce cable flop; and at least two cables connected to said anchor platform.

3. A device for eliminating cable flop, comprising:

a cable detangler mechanism attached to a bicycle, the bicycle having at least a frame, a brake lever, and a brake assembly, and the detangler mechanism comprising at least an upper cable assembly, a lower cable assembly, an upper plate, a lower plate, and a bearing unit;

a base connected to said cable detangler mechanism and attached to said brake lever of said bicycle;

an anchor platform pivotally connected to said base to pivot relative to said base to reduce cable flop; and at least two cables connected to said anchor platform.

* * * * *

UNITED STATES PATENT AND TRADEMARK OFFICE
CERTIFICATE OF CORRECTION

PATENT NO. : 6,164,153
DATED : December 26, 2000
INVENTOR(S) : Brian Scura

It is certified that error appears in the above-identified patent and that said Letters Patent is hereby corrected as shown below:

Column 1,
Line 27, after "92653," insert -- Cable --.

Column 5,
Lines 4-7, delete "In another embodiment, base 108 may be incorporated within the upper plate 15 of cable detangler 14 of FIG. 1. Base 108 may also be incorporated within the lower plate 17 of cable detangler 14 of FIG. 1."
Lines 9-12, delete "Cable 20 and 22, for example, can pass through the pivotable anchor platform 102 while cable sheathings 24 and 26, respectively, rest on pivotable anchor platform 102."
Lines 49-55, delete "Yet another embodiment, shown in FIG. 16, employs a pivotable anchor platform 154 in the upper or lower cable assemblies, 150 or 152 of FIG. 1. Anchor platform 154 is pivotably mounted by pin 156 to base 158. This mechanism is enclosed in casing 28. Cables 20 and 22, and cable sheathings 24 and 26 can be connected to the anchor platform 154 as in the previous embodiments."

Column 6,
Line 1-5, delete "In a further embodiment, anchor platform 162 is pivotably mounted by pin 164 to a suitable location on the bicycle frame, such as the seat mast 166, before cables 168 and 170, within respective cable sheathings 172, 174, reach the brake assembly 176."

Signed and Sealed this

Twenty-third Day of July, 2002

Attest:

Attesting Officer

JAMES E. ROGAN
Director of the United States Patent and Trademark Office